United States Patent Office 3,655,706
Patented Apr. 11, 1972

3,655,706
SYNTHESIS OF TETRAMETHYLLEAD
Robert G. Briody and Edward G. Newyear, Corpus Christi, Tex., assignors to PPG Industries, Inc., Pittsburgh, Pa.
No Drawing. Filed Nov. 20, 1969, Ser. No. 878,551
Int. Cl. C07f 7/24
U.S. Cl. 260—437 R  4 Claims

ABSTRACT OF THE DISCLOSURE

A process is described for the preparation of tetramethyllead which involves reacting methyl chloride and sodium-lead alloy together in the presence of magnesium-aluminum alloy as catalyst. The alloy is described as containing at least 20 percent by weight magnesium and the temperatures of operation are described as between 100° C. and 150° C.

BACKGROUND OF THE INVENTION

The reaction involved in the conventional method of preparing tetramethyllead may be conveniently illustrated by the following equation:

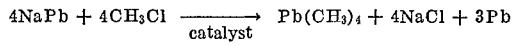
$$4NaPb + 4CH_3Cl \xrightarrow{catalyst} Pb(CH_3)_4 + 4NaCl + 3Pb$$

As will be appreciated the above reaction involves the conversion of one mole of lead to tetramethyllead. The 3 moles of elemental lead are typically recycled or reused to provide for further quantities of tetramethyllead when reacted with further quantities of methyl chloride. The reaction is catalyzed as indicated. Typical of the catalysts used are various aluminum complex compounds, particularly alkyl aluminum halides such as diethyl aluminum chloride. While catalysts such as diethyl aluminum chloride are useful in making a tetramethyllead by the above reaction they do result in the production of other alkyl lead compounds such as trimethylethyllead and dimethyldiethyllead. The quantity of tetramethyllead produced is therefore reduced. In addition alkyl aluminum catalysts present a bothersome problem in the storage and handling of concentrated solutions thereof. Problems associated with alkyl aluminum derivatives in tetramethyllead reaction systems are discussed in U.S. Patent 3,281,442.

THE PRESENT INVENTION

In accordance with the present invention, tetramethyllead is produced in high purity and in good yields from a reaction system in which methyl halide, preferably methyl chloride, is reacted with sodium-lead alloy in the presence of a catalyst comprising a magnesium-aluminum alloy. Alloys of magnesium-aluminum, when employed as catalysts in conventional tetramethyllead reactions such as described above, are found not only to be efficient as catalysts for producing tetramethyllead but are also found to be extremely effective in providing an essentially pure tetramethyllead product, that is, a product containing 99.5 percent tetramethyllead or more.

The reactions conducted in accordance with the instant invention are conducted at temperatures of at least 100° C., broadly between 100° C. to 150° C. A particularly effective reaction temperature range in conducting reactions in accordance with the instant invention is 110° C. to 120° C.

The magnesium-aluminum alloys utilized in conjunction with the instant invention to produce tetramethyllead typically contain at least 20 percent magnesium by weight basis the weight of the magnesium-aluminum alloy. The magnesium content of the alloy can be varied considerably and tetramethyllead is still produced. Typically the magnesium content of the magnesium-aluminum catalyst is between 20 to 70 percent by weight magnesium, preferably between 30 and 40 percent by weight.

In conducting the reactions of the instant invention recourse to the utilization of conventional sodium-lead alloys is had. These alloys may be freshly prepared sodium-lead alloys or they may be prepared from recycled active lead. There does not appear to be any criticality involved in the utilization of any particular sodium-lead alloy. Reaction times while subject to wide variation are generally maintained in a range of between 1 and 4 hours.

In conducting the reactions in accordance with this invention, pressure equipment is normally used and reaction pressures encountered typically are between 200 to 600 p.s.i.g., preferably between 400 to 600 p.s.i.g.

Methyl halides employed may be the chloride, bromide or iodide. Preferably methyl chloride is used. The methyl halide utilized should be as free as possible from contamination and substantially dry, that is, containing less than 250 parts per million water. Typically the methyl halide will contain between 15 to 200 parts per million water.

It is important in the practice of this invention that the magnesium-aluminum alloy catalyst once prepared, be protected from the atmosphere and from moisture since these alloys are quite active. Any reaction of the alloy catalyst with moisture or air tends to deactivate the catalyst. Thus, the handling of the alloy after preparation should be such that contamination by air and/or moisture is avoided.

The magnesium-aluminum alloy catalyst used in accordance with the instant invention is prepared typically by melting metallic aluminum and metallic magnesium in the desired quantities and mixing the two melted metals together. The molten metal mixture is then subjected to cooling to solidify it and crushed to any desired particle size for utilization in the methylation process, typically −30 to +60 mesh. All grinding, melting and crushing operations are conducted substantially in the absence of any oxygen or moisture.

The catalyst concentration is based on the mole percent of aluminum utilized as the catalyst basis the amount of lead in the sodium-lead alloy charged to the reaction system. In general this concentration is 1 to 4 mole percent aluminum.

For a more complete understanding of the present invention, reference is made to the accompanying examples which illustrate the method of preparing tetramethyllead utilizing magnesium-aluminum alloy.

Example 1

30 parts by weight of magnesium and 70 parts by weight of aluminum, basis the total weight of the alloy, were placed in a porcelain crucible and covered with a molten mixture of sodium chloride-potassium chloride. The sodium chloride and potassium chloride were present in equal quantities by weight. The contents of the crucible were placed in an electric furnace operating at over 700° C. After the metals had melted, the crucible was stirred with a paddle, the melt overlying the magnesium-aluminum protecting the magnesium-aluminum from oxidation. In addition the furnace was continuously flushed with helium to provide an inert atmosphere. After thorough stirring, the material was removed from the furnace and permitted to solidify. The sodium chloride-potassium chloride was washed from the surface of the metal and a thin section sawed off at the salt-metal interface in a dry box in a nitrogen atmosphere. A hacksaw blade was then utilized to saw powder from the surface of the metallic alloy in the dry box to provide magnesium-aluminum alloy in powder form.

The magnesium-aluminum alloy, prepared as described above, was utilized to prepare tetramethyllead in a laboratory stainless steel autoclave. The laboratory autoclave was charged with 0.202 mole of sodium-lead alloy screened to —¼ inch to +40 mesh size. Between 1 and 1.4 moles of methyl chloride were added to the reaction system. The catalyst concentration of aluminum basis the lead charged was 4 mole percent in each of the runs. The reaction time was maintained constant at 3 hours in the autoclave reactor. An inert atmosphere comprising argon was employed in the reactor and the reactor was placed in a constant temperature bath. Results of the runs made using the 30–70 magnesium-aluminum catalyst prepared as described above at temperatures of 100 to 120° C. are described below:

TABLE I

| Run Number | Temp. (° C.) | Na reacted (percent) | Yield percent TML basis Na charged | |
|---|---|---|---|---|
| | | | By G.C. | By EDTA |
| 1 | 100 | 70.2 | 48.3 | 49.4 |
| 2 | 120 | 99.9 | 75.6 | 73.9 |
| 3 | 120 | 98.4 | 79.0 | 76.8 |

Example 2

A magnesium-aluminum catalyst was prepared containing 60 weight percent magnesium by utilizing the procedures described above in Example 1 but using 60 parts magnesium and 40 parts aluminum by weight in making the mixture. The catalyst so prepared was placed in a stainless steel laboratory autoclave as described in Example 1 and several runs were made utilizing a sodium-lead alloy in a quantity of 0.202 mole. The alloy was at a mesh size of —¼ inch to +40 mesh. Methyl chloride ranging from 1 to 1.14 moles was employed. The reaction time was maintained at 3 hours and a catalyst concentration of aluminum basis the lead charged was 4 mole percent in each of the runs. The results of these runs at temperatures ranging from 100 to 120° C. are set forth below in Table II:

TABLE II

| Run Number | Temp. (° C.) | Na reacted (percent) | Yield percent TML basis Na charged | |
|---|---|---|---|---|
| | | | By G.C. | By EDTA |
| 1 | 100 | 29.8 | 18.5 | 20.1 |
| 2 | 120 | 79.6 | 59.6 | 58.1 |
| 3 | 120 | 70.2 | 53.8 | 51.8 |

In both of the above tables G.C. refers to analysis by gas chromatograph and EDTA refers to analysis by an ethylenediaminetetraacetic acid titration method.

As can be readily seen from the above examples the utilization of magnesium-aluminum alloys as tetramethyllead catalyst produces satisfactory yields of tetramethyllead basis the sodium charged. The catalyst is effective in that the product yielded is solely tetramethyllead.

It is preferred that these reactions be carried out at a temperature of at least 100° C. When temperatures are so regulated the catalytic activity of the magnesium-aluminum alloy is enhanced and tetramethyllead is produced in good yields.

While the invention has been described with reference to certain specific examples, the invention is not to be limited except as appears in the following claims.

We claim:

1. A method of preparing tetramethyllead comprising reacting methyl halide and sodium-lead alloy at temperature of at least 100° C. in the presence of a catalyst system consisting of magnesium-aluminum alloy containing 20 to 70 percent by weight magnesium basis the weight of the alloy.

2. A method of producing tetramethyllead from methyl halide and sodium-lead alloy comprising conducting the reaction in a reaction system consisting of magnesium-aluminum alloy containing 20 to 70 percent magnesium and the balance aluminum, methyl halide and sodium-lead alloy, at temperature of from 100° C. to 150° C. to thereby produce tetramethyllead.

3. The method of claim 2 wherein the methyl halide is methyl chloride.

4. The method of claim 1 wherein the methyl halide is methyl chloride.

References Cited

UNITED STATES PATENTS 3,113,955   12/1963   Sandy _____ 260—437
3,048,610   8/1962   Jarvie et al. _____ 260—437

TOBIAS E. LEVOW, Primary Examiner

H. M. S. SNEED, Assistant Examiner